UNITED STATES PATENT OFFICE.

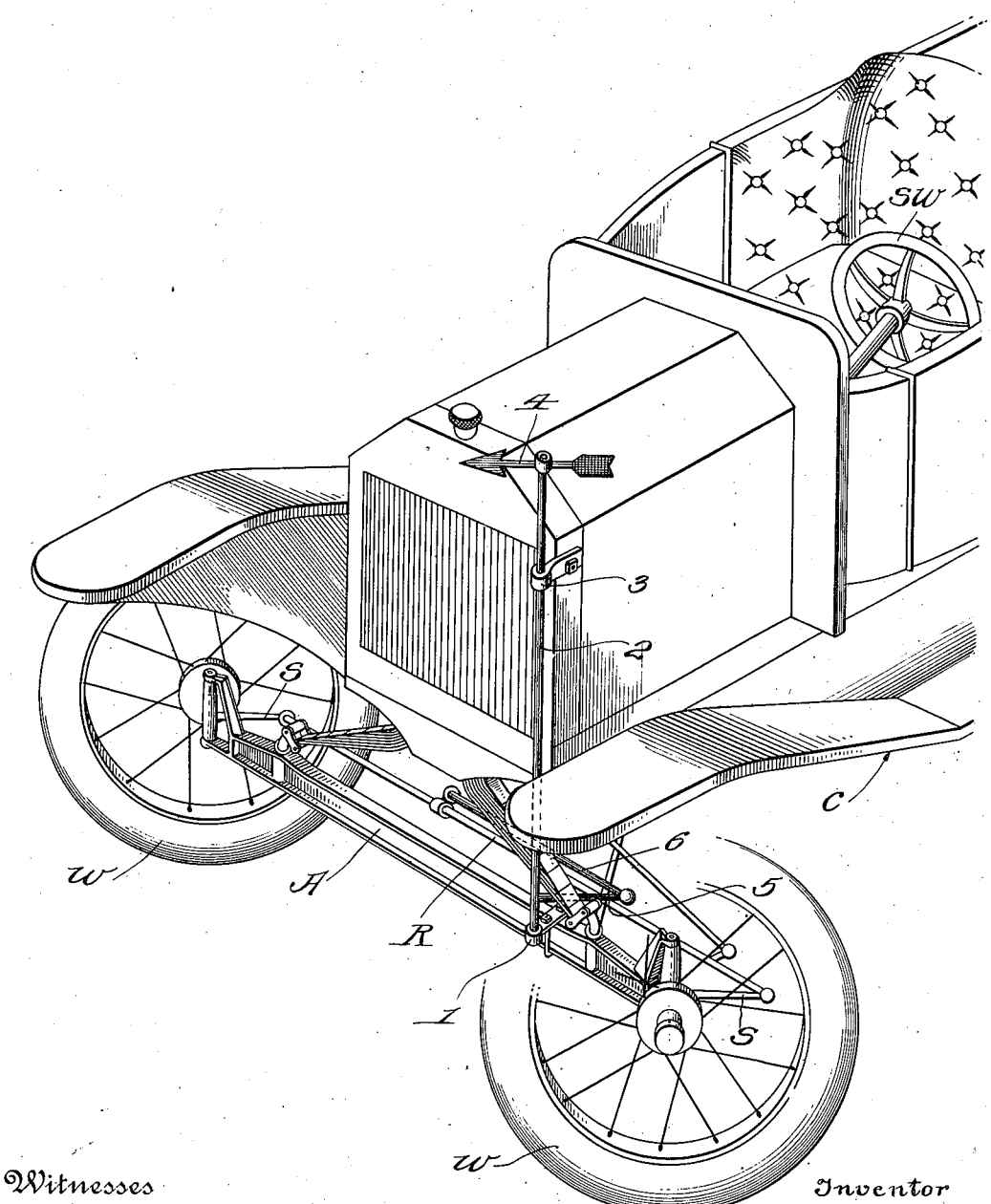

LEWIS P. HANSON, OF LONDON, MINNESOTA.

WHEEL-POSITION INDICATOR.

1,166,680.  Specification of Letters Patent.  Patented Jan. 4, 1916.

Application filed May 10, 1915. Serial No. 27,177.

*To all whom it may concern:*

Be it known that I, LEWIS P. HANSON, a citizen of the United States, residing at London, in the county of Freeborn and State of Minnesota, have invented certain new and useful Improvements in Wheel-Position Indicators; and I do declare the following to be a full, clear, and exact description of the invention, such as will enable others skilled in the art to which it appertains to make and use the same.

My invention relates broadly to improvements in automobile accessories and more particularly to a device for indicating to the driver of an automobile, the exact angular relation of the front wheels thereof, in respect to the direction of travel, such a device being advantageous when traveling through sand or the like, in turning the car out of ruts, in running in or backing out of narrow alleys and the like, in rounding curves, and in starting the car after a stop has been made, a glance at the indicator disclosing the angle at which the front wheels are set.

The object of the invention is to provide an extremely simple, inexpensive, and durable device for accomplishing the above end in an efficient manner.

With this object in view, the invention resides in certain novel features of construction and in the unique combination of parts hereinafter fully described and claimed.

In describing the invention, I shall refer to the accompanying drawing wherein a perspective view of a portion of an automobile equipped with the invention is disclosed.

In this drawing, which constitutes a part of the application, C indicates the chassis of an automobile, A the front axle and W the front wheels thereof, S the steering arms of the wheels W, R the transverse steering rod connecting the arms S and shiftable by the steering wheel SW to guide the machine.

All of the parts just enumerated constitute parts of a common type of automobile, the construction of such parts being therefore unessential.

Disposed in advance of the chassis and rotatably mounted at its lower end in a bearing 1 clamped to the axle A, is an upright shaft 2 whose intermediate portion is rotatably and slidably mounted in an additional bearing 3 which preferably though not necessarily projects forwardly from the radiator of the car. The upper end of the shaft 2 is provided with an indicator 4 here shown in the form of an arrow although it may be of any preferred design. As hereinbefore suggested, it is the intention of the present invention to retain the indicator 4 in substantially parallel relation to the wheels W, whereby the angular relation of these wheels to the remainder of the vehicle may be seen at a glance. For accomplishing this end, numerous forms of operating connections between the upright shaft 2 and the steering rod R or other parts movable upon steering the wheels W, may be provided. As illustrative of one of such forms, the drawing discloses a rigid crank arm 5 projecting rearwardly from the lower end of the shaft 2 and pivoted to one end of a link 6, the other end of the latter being pivoted to the steering rod R. Thus it will be evident that regardless of the amount or direction in which the wheels W are turned, the indicator 4 will be moved in the same direction, thus allowing the operator to readily ascertain at a glance, the position of said wheels, this being advantageous for the numerous reasons hereinbefore stated.

From the foregoing description, taken in connection with the accompanying drawing, it will be evident that although extremely simple and comparatively inexpensive construction has been provided for carrying out the object of the invention, the device will be efficient and durable and will possess a number of advantages.

In the drawings, certain specific details have been shown for accomplishing probably the best results, and in the preceding such details have been described, but it will be evident that I need not be limited thereto or to proportions of parts, character of materials, and other unessential details.

I claim:

The combination with an automobile, of a bearing spaced in advance of one end of the front axle thereof, a clamp securing the bearing to the axle, an upright shaft having its lower end rotatably mounted in said bearing, its upper end being positioned in a plane above the body of the machine, an indicator secured to said upper end of the shaft, an additional bearing projecting forwardly from the body of the automobile and receiving the intermediate portion of the shaft revolubly and slidably, a crank arm projecting rearwardly from the lower end of the shaft and disposed substantially parallel to the steering arms of the automobile, and a link connecting said crank arm to the transverse steering rod of said automobile.

In testimony whereof I have hereunto set my hand in presence of two subscribing witnesses.

LEWIS P. HANSON.

Witnesses:
S. SWANSON,
E. PETERMAN.